United States Patent
Moellmann

(10) Patent No.: US 6,952,006 B2
(45) Date of Patent: Oct. 4, 2005

(54) MICROSCOPE, DETECTOR, AND METHOD FOR MICROSCOPY

(75) Inventor: Kyra Moellmann, Trippstadt (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 83 days.

(21) Appl. No.: 10/366,097

(22) Filed: Feb. 13, 2003

(65) Prior Publication Data

US 2003/0155482 A1 Aug. 21, 2003

(30) Foreign Application Priority Data

Feb. 20, 2002 (DE) ......................................... 102 06 980

(51) Int. Cl.⁷ ............................................... H01L 31/00
(52) U.S. Cl. ................................... 250/214.1; 250/234
(58) Field of Search .......................... 250/207, 214.1, 250/214 VT, 234; 257/435, 444

(56) References Cited

U.S. PATENT DOCUMENTS

| | | | |
|---|---|---|---|
| 5,034,613 A | | 7/1991 | Denk et al. ............... 250/458.1 |
| 5,777,732 A | | 7/1998 | Hanninen et al. ............ 356/318 |
| 6,078,183 A | * | 6/2000 | Cole, Jr. ....................... 324/752 |
| 6,122,042 A | * | 9/2000 | Wunderman et al. .......... 356/73 |
| 6,195,167 B1 | * | 2/2001 | Reid et al. ................... 356/450 |
| 6,316,950 B1 | * | 11/2001 | Denk et al. .................. 324/752 |
| 6,466,040 B1 | * | 10/2002 | Simon et al. ................ 324/752 |

FOREIGN PATENT DOCUMENTS

| | | |
|---|---|---|
| DE | 4414940 | 11/1995 |
| DE | 19919091 | 11/2000 |

* cited by examiner

Primary Examiner—David Porta
Assistant Examiner—Patrick J. Lee
(74) Attorney, Agent, or Firm—Davidson, Davidson & Kappel, LLC

(57) ABSTRACT

A microscope having a light source that emits light pulses for illumination of a specimen, the light pulses containing photons having a photon energy, is disclosed. The microscope is characterized in that a detector, which has an energy band gap between a quiescent state and an active state that is greater than the photon energy, is provided for determination of a time-defined pulse width of the light pulses. Also described are a detector for determination of a time-defined pulse width of light pulses for illumination of a microscopic specimen, and a method for microscopy.

21 Claims, 2 Drawing Sheets

MICROSCOPE, DETECTOR, AND METHOD FOR MICROSCOPY

CROSS REFERENCE TO RELATED APPLICATIONS

This application claims priority of the German patent application 102 06 980.8 which is incorporated by reference herein.

FIELD OF THE INVENTION

The invention concerns a microscope having a light source that emits light pulses for illumination of a specimen, the light pulses containing photons having a photon energy.

The invention furthermore concerns a detector for determining a time-defined pulse width of light pulses for illumination of a microscopic specimen.

The invention additionally concerns a method for microscopy.

BACKGROUND OF THE INVENTION

For the examination of biological specimens, it has been usual for some time to prepare the specimen with optical markers, in particular with fluorescent dyes. Often, for example in the field of genetic investigations, several different fluorescent dyes are introduced into the specimen and become attached specifically to certain specimen constituents. From the fluorescence properties of the prepared specimen it is possible, for example, to draw conclusions regarding the nature and composition of the specimen, or the concentrations of specific substances within the specimen.

In scanning microscopy, a specimen is illuminated with a light beam in order to observe the detected light emitted, as reflected or fluorescent light, from the specimen. The focus of an illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detected light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam. A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels back through the beam deflection device to the beam splitter, passes through it, and is then focused onto the detection pinhole behind which the detectors are located. This detection arrangement is called a "descan" arrangement. Detected light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers. Commercial scanning microscopes usually comprise a scanning module that is flange-mounted onto the stand of a conventional light microscope, the scanning module additionally containing all the aforesaid elements necessary for scanning a specimen.

In confocal scanning microscopy, a detection pinhole can be dispensed with in the case of two-photon (or multi-photon) excitation, since the excitation probability depends on the square of the photon density and thus on the square of the illuminating light intensity, which of course is much greater at the focus than in the adjacent regions. The fluorescent light being detected therefore very probably originates almost exclusively from the focus region, which renders superfluous any further differentiation, using a pinhole arrangement, between fluorescent photons from the focus region and fluorescent photons from the adjacent regions.

Many fluorescent dyes can be excited only with ultraviolet illuminating light. The use of ultraviolet illuminating light has the disadvantage, especially for living specimens, of much greater specimen damage. In addition, all optical components must be transparent to ultraviolet light and to the fluorescent light that, because of the Stokes shift, has a greater wavelength, and must not be damaged as a result of illumination with ultraviolet light. With cemented optical components in particular, such as lens element groups in a microscope objective, illumination with ultraviolet light causes irreversible damage to the cement and to the lens elements. A further disadvantage of illumination with ultraviolet light has to do with the shallower penetration depth into biological specimens. The disadvantages can be eliminated by two-photon or multi-photon excitation. In multi-photon scanning microscopy, the fluorescent photons that are attributable to a two-photon or multi-photon excitation process are detected. The probability of a two-photon transition depends on the square of the exciting light power level. In order to achieve high light power levels, it is therefore useful to pulse the illuminating light in order to achieve high peak pulse power levels. This technique is known, and is disclosed e.g. in U.S. Pat. No. 5,034,613 "Two-photon laser microscopy" and in German Unexamined Application DE 44 14 940. A further advantage of multi-photon excitation, especially in confocal scanning microscopy, is improved bleaching behavior, since the specimen bleaches only in the region of sufficient power density, i.e. at the focus of an illuminating light beam. Outside this region, in contrast to one-photon excitation, almost no bleaching takes place.

In a microscope with multi-photon excitation of the specimen, a mode-coupled laser that emits a pulse train with ultra-short pulses is usually used as the light source; the pulses have time-defined pulse widths in the vicinity of a few picoseconds or a few femtoseconds. The repetition rate of the pulses is typically 80 MHz. At present, the time-defined pulse width cannot be directly measured even with the fastest photodiodes. Indirect measurement methods and complex autocorrelators, which are expensive and in most cases usable only for a limited wavelength region, are used to ascertain the time-defined pulse widths. Only the pulse train itself, i.e. the sequence of pulses, is detectable with fast detectors.

A parasitic measurement of the time-defined pulse widths of the exciting light during microscopic examination of a specimen is important, since the pulse widths of the pulses emitted by the laser may fluctuate greatly; this directly influences the nonlinear effects that are being deliberately excited in the specimen (two-photon absorption, generation of second harmonic, etc.), and can thus result in incorrect information in the image. Parasitic monitoring of this kind with an autocorrelator is very complex and laborious.

German Unexamined Application DE 199 19 091 A1 discloses an arrangement for adjusting the laser power level and/or pulse length in a microscope, a specimen being excited by irradiation with a short-pulse laser to produce nonlinear fluorescence, preferably two-photon fluorescence; the nonlinear fluorescence signal, as well as a reflected signal and/or a reference signal corresponding to the laser power level, being detected; and the ratio of the fluorescence signal to the reflected signal and/or reference signal serving as a control signal for adjustment.

SUMMARY OF THE INVENTION

It is therefore the object of the invention to describe a microscope that can be manufactured simply and economically and that permits uncomplicated and reliable determination, even during examination of the specimen, of the time-defined pulse width of the light pulses illuminating a specimen.

The object is achieved by way of a microscope having
  a light source that emits light pulses for illumination of a specimen, the light pulses containing photons having a photon energy, and
  a detector for determination of a time-defined pulse width of the light pulses, wherein the detector has an energy band gap between a quiescent state and an active state that is greater than the photon energy, is provided.

A further object of the invention is to describe a detector that can be manufactured simply and economically and that permits uncomplicated and reliable determination, even during examination of the specimen, of the time-defined pulse width of the light pulses illuminating a specimen.

This object is achieved by way of a detector for determining a time-defined pulse width of light pulses for illumination of a microscopic specimen, wherein the detector has an energy band gap between a quiescent state and an active state that is greater than the photon energy.

An additional object of the invention is to propose a method that makes possible optimized multi-photon microscopy.

The aforesaid object is achieved by way of a method comprising the following steps:
  generating light pulses for illumination of a specimen using a light source, the light pulses containing photons having a photon energy;
  determining a time-defined pulse width of the light pulses, using a detector which has an energy band gap between a quiescent state and an active state that is greater than the photon energy.

The invention has the advantage of making possible, in simple and reliable fashion, a determination of the time-defined pulse width of the light pulses illuminating a specimen. The determination is preferably made in parasitic fashion during examination of the specimen, so that a manual or automatic optimization of the pulse width of the light pulses of the illuminating light can also easily be implemented. A control loop that optimizes the pulse width to a maximum fluorescent light yield is preferably provided for this purpose.

In a preferred embodiment, the detector encompasses a semiconductor detector having a valence band and a conduction band, the energy band gap being the gap in energy between valence band and conduction band. In a semiconductor detector of this kind, a transition from the valence band into the conduction band cannot be caused by a one-photon transition. A transition can be accomplished essentially only by way of multi-photon processes. Since the power density, with unpulsed light and at the illuminating light power levels common in microscopy, is very low (in the range of microwatts to a few milliwatts), most photons do not interact with the detector, so that the detector is almost insensitive to unpulsed light. The shorter the light pulses, the greater the power density for the same average power level, and the higher the probability of a two-photon or multi-photon transition from the valence band into the conduction band, in which (as is known) two or more photons must strike almost the same location at almost identical times. The amplitude of the electrical signal generated by the detector is consequently an indication of the time-defined pulse width.

The semiconductor detector is preferably a GaAsP photodiode (e.g. Hamamatsu G1117). These special photodiodes are sensitive in the region from 300 to 680 nm, i.e. they can detect only in that spectral region. Titanium:sapphire (Ti:Sa) lasers that emit laser radiation in the region from approx. 700 to 1000 nm are typically used in two-photon laser scanning microscopes. It is also conceivable to use Nd:YAG lasers at 1064 nm, or other mode-coupled lasers. It is important that the laser radiation itself not be detectable by the photodiodes via a one-photon effect. The short light pulses, however, are detectable as described above; a two-photon effect brought about by a Ti:Sa laser at 800 nm has the same result as irradiation of a 400-nm radiation onto the detector, and this wavelength lies exactly in the spectrally sensitive region of the detector. Since a two-photon effect, i.e. a nonlinear effect, is present here, for a given average light power level the detected signal becomes greater as the laser pulses become shorter and as the peak pulse power level, on which the time-defined pulse width depends, becomes higher. Most commercially available photodiodes are sufficiently sensitive to function with only a small portion of the emitted light of the light source. The spectrally sensitive region of the diode can preferably be selected so that the laser radiation produces only two-photon effects but not three-photon effects.

Suitable semiconductor detector materials are, for example, GaAsP, AlGaAs, InGaAs, Ge, Si, GaAs. GaAsP photodiodes are very particularly usable for the detection of light pulses in the wavelength region from approx. 700 to 1300 nm. Other semiconductor detectors that have a different energy gap between the valence band and conduction band cover other wavelength regions.

In another preferred embodiment, the detector encompasses a photomultiplier having a photoactive surface, the energy band gap being the ionization energy of the photoactive surface.

In a preferred embodiment, the energy band gap is less than twice the photon energy, so that essentially two-photon transitions are detectable in this embodiment.

Calibration of the detector is necessary in order to achieve an absolutely quantitative measurement of the time-defined pulse width. Since fluctuations over time in the average light power level $P_{ave}$ of the light proceeding from the light source are unavoidable, in a very particularly preferred embodiment a further detector, which has a further energy band gap that is less than the photon energy, is provided for determination of the average power level of the light emitted from the light source. The further detector is activatable by one-photon transitions. The electrical signal $S_{ave}$ generated by it is preferably proportional to the average power level $P_{ave}$ of the light. If $S_{ave}$ and $S_{puls}$ (the electrical signal of the detector for determination of a time-defined pulse width) are known, the fluctuations can be accounted for by calculation using the following equation:

$$S_{ave} \sim P_{ave}, \; S_{puls} \sim P_{peak}^2 P_{ave}^2/(\Delta\tau \cdot f)^2, \; \rightarrow S_{puls}/S_{ave}^2 \sim \Delta\tau^{-2}$$

where $P_{peak}$ is the peak pulse power level, $\Delta\tau$ the time-defined pulse width, and f the pulse-train frequency.

The smaller the time-defined pulse width $\Delta\tau$, therefore, the greater the ratio, fluctuations in the average power level already being taken into account.

With the combination of two detectors, two control parameters are available that can affect the image quality in a microscope, namely modification of the average power level and variation of the pulse width. A knowledge of the changes in parameters during image acquisition is important for an assessment of image quality. The arrangement can be used in descan and non-descan arrangement. The NDD arrangement offers the possibility of making statements about a relative pulse widening brought about e.g. by the specimen.

In a preferred embodiment, a beam splitter is provided that conveys to the detector—and, if applicable, to the further detector—a portion of the light emitted from the light source. The beam splitter is preferably arranged directly after the light source.

In another embodiment, the detector is arranged after the specimen. This embodiment is particularly suitable for making statements about the dispersion behavior of the microscope and the specimen.

In a very particularly preferred embodiment, the microscope is a scanning microscope, in particular a confocal scanning microscope.

In a preferred embodiment, the detector is of modular configuration and can be introduced into the beam path of a microscope. This embodiment is suitable in particular for retrofitting systems that are already installed. Guidance and stop elements are preferably provided for exact positioning. In a particularly preferred embodiment, a detector for determining a time-defined pulse width of light pulses is combined, in one module, with a further detector for determining the average light power level. A PC is preferably provided for evaluation and analysis of the electrical signals generated by the detectors.

In a preferred embodiment, the method according to the present invention contains the further step of determining the average power level of the light emitted from the light source using a further detector that has a further energy band gap which is less than the photon energy, and the further step of correcting the determined pulse width of the light pulses on the basis of the determined average power level of the light emitted from the light source.

In a particularly preferred embodiment, the further step of optimizing the time-defined pulse width of the light pulses emitted from the light source on the basis of the measured time-defined pulse width is provided.

BRIEF DESCRIPTION OF THE DRAWINGS

The subject matter of the invention is schematically depicted in the drawings and will be described below with reference to the Figures, identically functioning elements being labeled with the same reference characters. In the drawings.

DETAILED DESCRIPTION OF THE INVENTION

Figure 1:
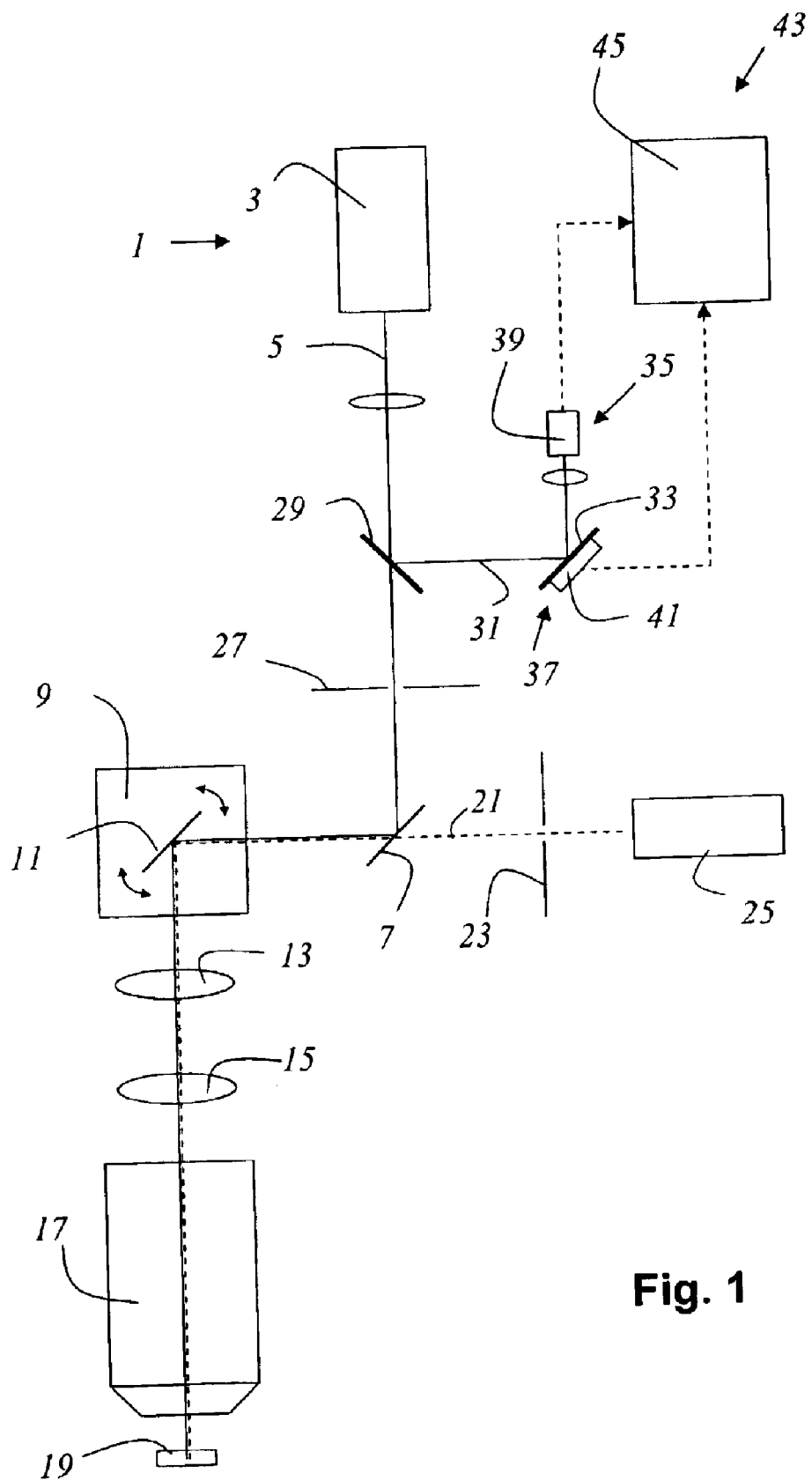
FIG. 1 shows a microscope according to the present invention.

FIG. 1 schematically shows a microscope according to the present invention that is embodied as a confocal scanning microscope. The microscope contains a light source 1 that is embodied as a mode-coupled titanium:sapphire laser 3. Light 5 emitted from titanium:sapphire laser 3, which has a wavelength of 780 nm, contains light pulses with a repetition rate of 80 MHz. The duration of the light pulses is approx. 1 ps. After passing through an excitation pinhole 27, light 5 is reflected by a main beam splitter 7 of a beam deflection device 9 that contains a gimbal-mounted mirror 11, and is guided by beam deflection device 9, through scanning optical system 13, tube optical system 15, and objective 17, over or through specimen 19. Detected light 21 proceeding from specimen 19 travels along the same light path through beam deflection device 9 back to main beam splitter 7, passes through the latter, and after passing through detection pinhole 23 strikes photomultiplier 25. In the drawings, light 5 for illumination of specimen 19 is depicted with a solid line, whereas detected light 21 proceeding from specimen 19 is depicted with dashed lines.

Arranged in the beam path of light 5 between light source 1 and main beam splitter 7 is a beam splitter 29 that reflects a partial light beam 31, with approx. 5% of light 5, to a further beam splitter 33. Further beam splitter 33 directs partial light beam 31, split once again into equal parts, on the one hand to a detector 35 for determination of the time-defined pulse width and on the other hand to a further detector 37 for determination of the average light power level. Detector 35 is embodied as a semiconductor detector 39, specifically as a GaAsP photodiode, and according to information from the manufacturer is sensitive to light in the wavelength region from 300 to 680 nm. Detector 35 generates electrical signals that are proportional to the square of the peak power level of the light pulses. Further detector 37 is embodied as photodiode 41 and generates electrical signals that are proportional to the average power level of light 5. The electrical signals are conveyed for analysis to a control unit 43 that is configured as PC 45. The time-defined pulse width that is determined is displayed to the user.

Figure 2:
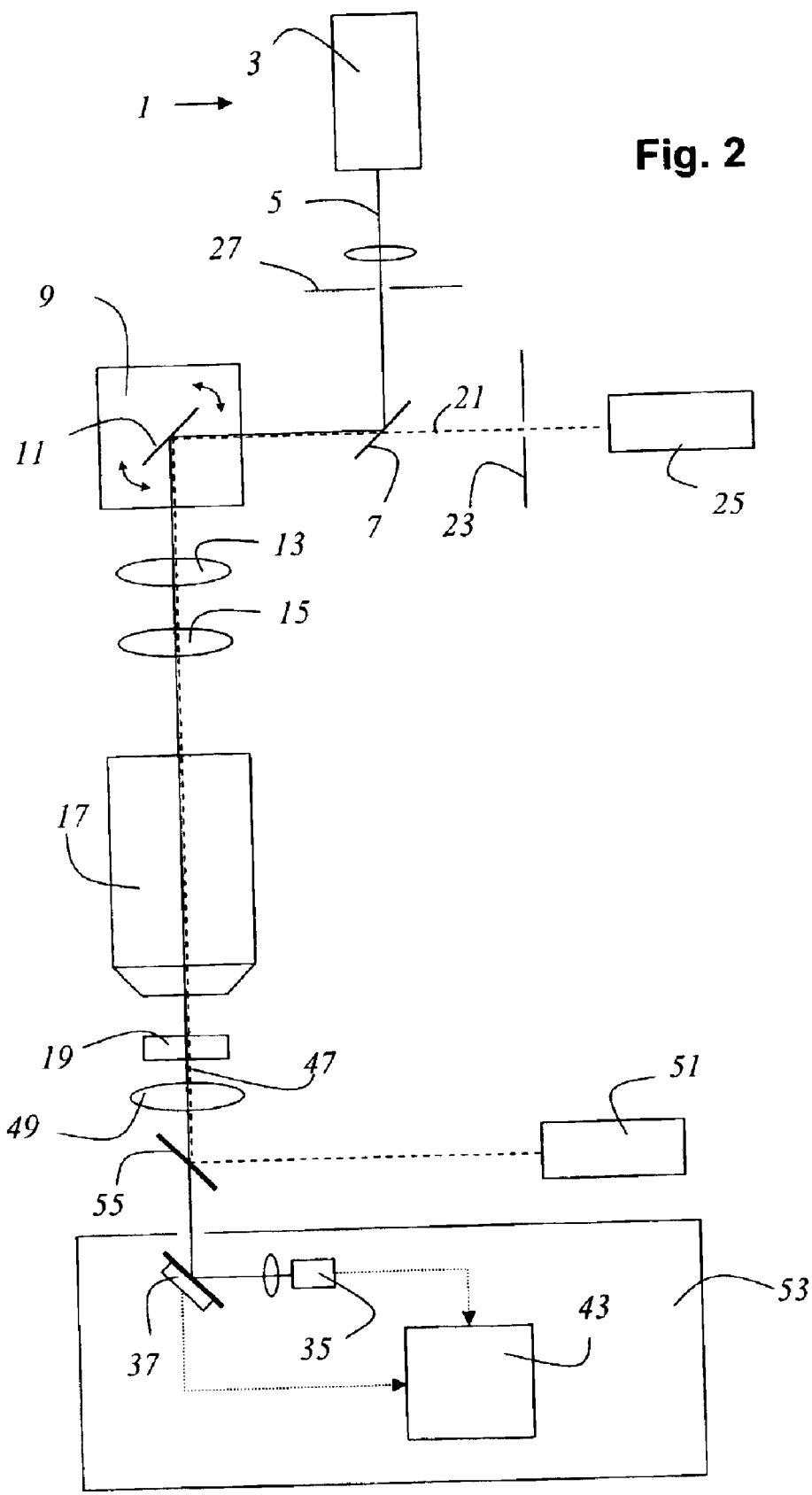
FIG. 2 shows a further microscope according to the present invention.

FIG. 2 shows a further microscope according to the present invention with non-descan detection. In this microscope the further detected light 47 proceeding from the specimen on the condenser side, which is fluorescent light, is also detected by being concentrated into a beam with a condenser 49 and conveyed to a further photomultiplier 51.

Detector 35 for determination of the time-defined pulse width of light 5 passing through the specimen, and further detector 37 for determination of the average light power level, are embodied as module 53. Arranged between condenser 49 and module 53 is a dichroic beam splitter 55 that conveys the fluorescent light to further photomultiplier 51 and allows light 5—which, constituting excitation light, has a different wavelength from the fluorescent light—to pass to the module. Located inside the module is a control unit 43 for analyzing the signals generated by detector 35 and by further detector 37.

The invention has been described with reference to a particular exemplary embodiment. It is self-evident, however, that changes and modifications can be made without thereby leaving the range of protection of the claims below.

What is claimed is:

1. A microscope comprising:
   a light source that emits light pulses for illumination of a specimen, the light pulses containing photons having a photon energy, and a detector for determination of a time-defined pulse width of the light pulses, wherein the detector has an energy band gap between a quiescent state and an active state that is greater than the photon energy.

2. The microscope as defined in claim 1, wherein the transition from the quiescent state into the active state contains a multi-photon process.

3. The microscope as defined in claim 1, wherein the detector encompasses a semiconductor detector having a valence band and a conduction band, the energy band gap being the gap in energy between valence band and conduction band.

4. The microscope as defined in claim 1, wherein the detector encompasses a photomultiplier having a photoactive surface, the energy band gap being the ionization energy of the photoactive surface.

5. The microscope as defined in claim 1, wherein the energy band gap is less than twice the photon energy.

6. The microscope as defined in claim 1, having a further detector for determination of the average power level of the light emitted from the light source, wherein the further detector has a further energy band gap that is less than the photon energy.

7. The microscope as defined in claim 1, wherein a beam splitter is provided that conveys to the detector a portion of the light emitted from the light source.

8. The microscope as defined in claim 1, wherein the detector is disposed downstream of the specimen.

9. The microscope as defined in claim 1, wherein the microscope is a scanning microscope.

10. A detection apparatus for determining a time-defined pulse width of light pulses for illumination of a microscopic specimen, the light pulses containing photons having a photon energy, the detection apparatus comprising:

a detector having an energy band gap between a quiescent state and an active state that is greater than the photon energy and configured to generate electrical signals; and an analysis device configured to analyze the electrical signals.

11. The detection apparatus as defined in claim 10, wherein the transition from the quiescent state into the active state contains a multi-photon process.

12. The detection apparatus as defined in claim 10, wherein the detector encompasses a semiconductor detector having a valence band and a conduction band, the energy band gap being the gap in energy between valence band and conduction band.

13. The detection apparatus as defined in claim 10, wherein the detector encompasses a photomultiplier having a photoactive surface, the energy band gap being the ionization energy of the photoactive surface.

14. The detection apparatus as defined in claim 10, wherein the energy band gap is less than twice the photon energy.

15. The detection apparatus as defined in claim 10, wherein the detector comprises a further detector, which has a further energy band gap that is less than the photon energy, for determination of the average power level of the light emitted from the light source.

16. A method for microscopy comprising the steps of:

generating light pulses for illumination of a specimen using a light source, the light pulses containing photons having a photon energy;

determining a time-defined pulse width of the light pulses, using a detector which has an energy band gap between a quiescent state and an active state that is greater than the photon energy.

17. The method as defined in claim 16, wherein the transition from the quiescent state into the active state contains a multi-photon process.

18. The method as defined in claim 16, wherein the detector encompasses a semiconductor detector having a valence band and a conduction band, the energy band gap being the gap in energy between valence band and conduction band.

19. The method as defined in claim 16, wherein the detector encompasses a photomultiplier having a photoactive surface, the energy band gap being the ionization energy of the photoactive surface.

20. The method as defined in claim 16 comprising the further steps of:

determining the average power level of the light emitted from the light source using a further detector that has a further energy band gap which is less than the photon energy, and;

correcting the determined pulse width of the light pulses on the basis of the determined average power level of the light emitted from the light source.

21. The method as defined in claim 16 comprising the further step of:

optimizing the time-defined pulse width of the light pulses emitted from the light source on the basis of the measured time-defined pulse width.

* * * * *

UNITED STATES PATENT AND TRADEMARK OFFICE
CERTIFICATE OF CORRECTION

PATENT NO.     : 6,952,006 B2
DATED          : October 4, 2005
INVENTOR(S)    : Kyra Moellmann It is certified that error appears in the above-identified patent and that said Letters Patent is hereby corrected as shown below:

Column 5,
Line 5, should read:
-- $S_{ave} \sim P_{ave}, S_{puls} \sim P_{peak}^2 \sim P_{ave}^2/(\Delta\tau \cdot f)^2, \Rightarrow S_{puls}/S_{ave}^2 \sim \Delta\tau^{-2}$ --.

Signed and Sealed this

Thirty-first Day of January, 2006

JON W. DUDAS
*Director of the United States Patent and Trademark Office*